United States Patent
James

(10) Patent No.: US 8,439,647 B2
(45) Date of Patent: May 14, 2013

(54) COOLED TURBINE AIRFOIL FABRICATED FROM SHEET MATERIAL

(75) Inventor: Allister W. James, Chuluota, FL (US)

(73) Assignee: Siemens Energy, Inc., Orlando, FL (US)

( * ) Notice: Subject to any disclaimer, the term of this patent is extended or adjusted under 35 U.S.C. 154(b) by 908 days.

(21) Appl. No.: 12/555,106

(22) Filed: Sep. 8, 2009

(65) Prior Publication Data

US 2011/0058934 A1    Mar. 10, 2011

(51) Int. Cl.
*F01D 5/18* (2006.01)

(52) U.S. Cl.
USPC .......................... 416/232; 416/233; 29/889.72

(58) Field of Classification Search .................. 416/232, 416/233; 29/889.21, 889.7, 889.72, 889.721
See application file for complete search history.

(56) References Cited

U.S. PATENT DOCUMENTS

| | | | |
|---|---|---|---|
| 2,451,454 A | 10/1948 | Watter | |
| 2,506,244 A | 5/1950 | Stopka | |
| 2,834,573 A * | 5/1958 | Stalker | 415/220 |
| 3,097,982 A | 7/1963 | Stoner | |
| 3,606,580 A * | 9/1971 | Kaufman, Sr. | 416/232 |
| 3,623,204 A * | 11/1971 | Wagle | 228/182 |
| 4,814,029 A | 3/1989 | Butcher | |
| 5,176,499 A | 1/1993 | Damlis et al. | |
| 5,240,376 A | 8/1993 | Velicki | |
| 5,384,959 A | 1/1995 | Velicki | |
| 5,499,904 A | 3/1996 | Wallace et al. | |
| 5,941,446 A | 8/1999 | Yasui | |
| 6,431,837 B1 | 8/2002 | Velicki | |
| 6,478,535 B1 | 11/2002 | Chung et al. | |
| 6,746,755 B2 | 6/2004 | Morrison et al. | |

* cited by examiner

*Primary Examiner* — Dwayne J White

(57) ABSTRACT

A turbine airfoil (20) fabricated as an assembly of U-channels (22A-E), each U-channel having a closed side formed by a cross wall (25), an open side (26) opposite the cross wall, and two side walls (27) extending from the cross wall to the open side. The U-channels are attached to each other in a parallel, closed-side to open-side sequence, forming a series of cooling channels (23) oriented span-wise (S) in the airfoil. A first of the U-channels (22A) has a curved cross wall forming the leading edge (24) of the airfoil. A last of the U-channels (22E) may have side walls (27) that converge to form a trailing edge (28) of the airfoil. Alternately, a solid trailing edge (22E') may be attached to a last of the U-channels. Each U-channel may be bonded to an adjacent U-channel using half-lap joints (30).

12 Claims, 4 Drawing Sheets

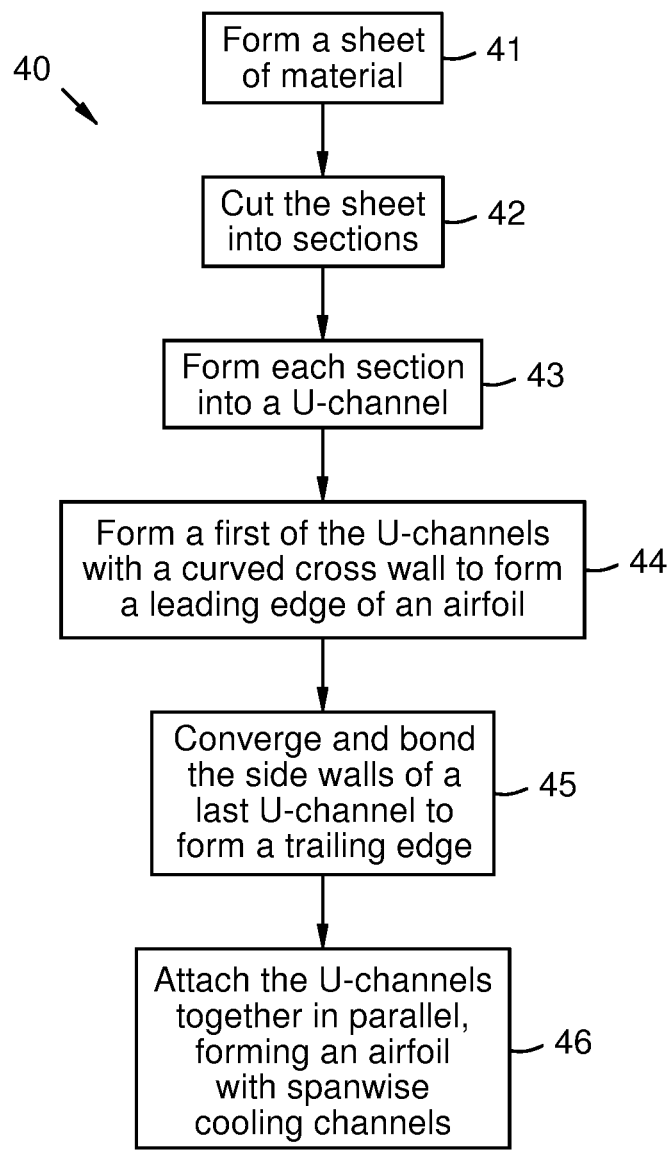

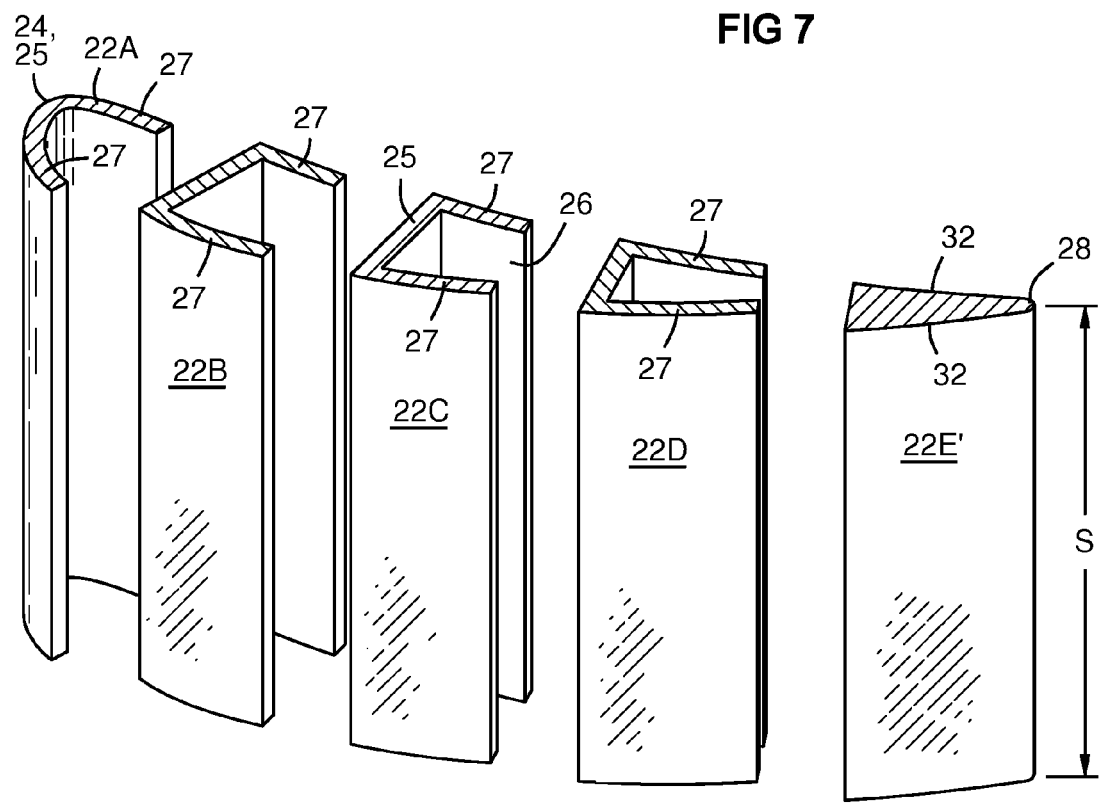

COOLED TURBINE AIRFOIL FABRICATED FROM SHEET MATERIAL

FIELD OF THE INVENTION

The invention relates to fabrication of airfoils, particularly for gas turbine engines.

BACKGROUND OF THE INVENTION

Airfoils for gas turbine blades are typically manufactured by precision casting or forging. Casting is usually preferred when internal cooling features are required. When solid blades without internal cooling passages are acceptable, forging may be used. However, neither of these conventional manufacturing processes may be suitable for very large turbine blades that require internal cooling. In addition to the challenges associated with the casting of very large blades, such as the control of wall thickness, avoidance of core breakage, and dimensional control, the resulting blade may be too heavy and may exceed the allowable blade disc loading because the minimum practical wall thickness that can be cast reliably becomes a limiting factor in the blade design.

Super-plastic forming is used commercially in the manufacture of large titanium alloy fan blades for aero engines. However, nickel-based superalloys will be required for some land-based turbine designs due to higher operating temperatures. Such alloys are not suitable for super-plastic forming.

BRIEF DESCRIPTION OF THE DRAWINGS

The invention is explained in the following description in view of the drawings that show:

FIG. 6 is a flowchart of a method of the invention.

FIG. 7 is sectional view of an embodiment with a solid trailing edge.

DETAILED DESCRIPTION OF THE INVENTION

A cellular sheet metal airfoil and fabrication method according to aspects of the invention includes the fabrication of multiple airfoil longitudinal sections which are subsequently bonded together to form the airfoil. The term "channel" or "U-channel" as used herein means an elongated structural member with a generally U-shaped or C-shaped or V-shaped cross section, without limitation as to proportions, angularity, or orientation.

Figure 1:
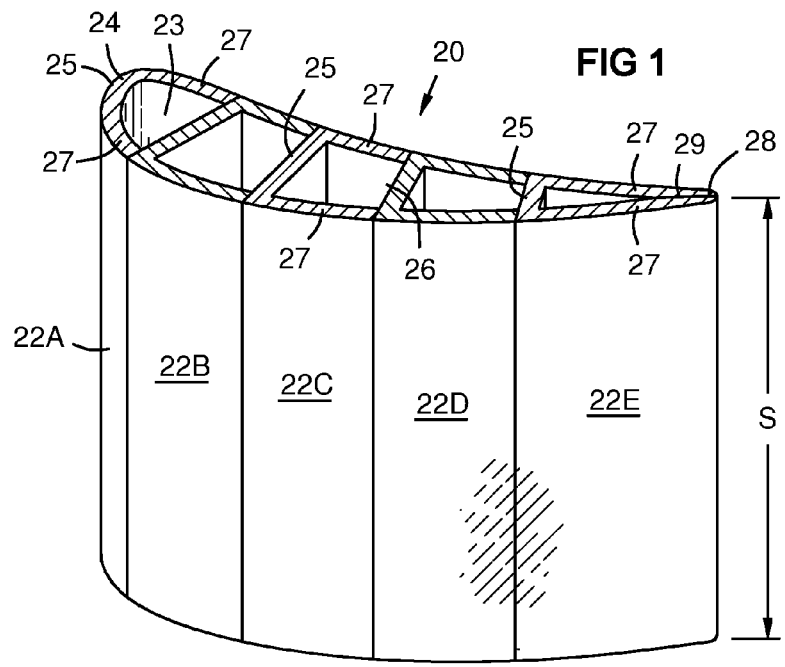
FIG. 1 is a perspective view of an airfoil according to aspects of the invention.
Figure 3:
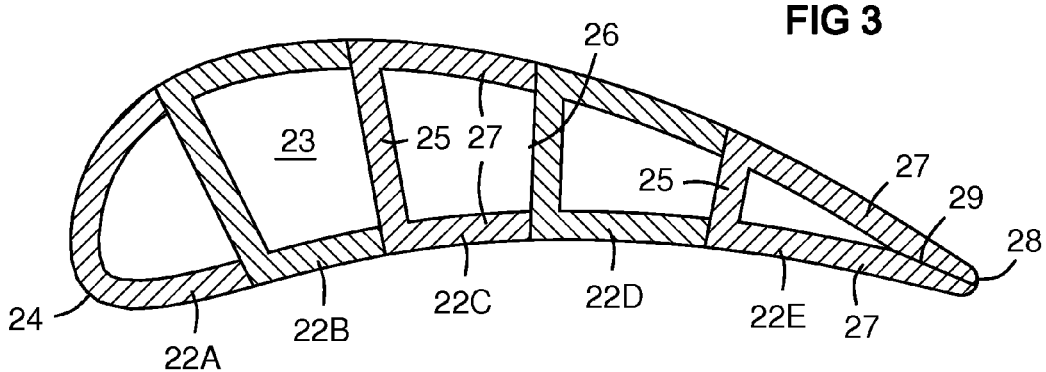
FIG. 3 is sectional view of the airfoil of FIG. 1.

FIG. 1 shows an airfoil 20 formed of multiple channels or U-channels 22A-22E, and FIG. 3 shows this airfoil in cross-section. Each U-channel has a closed side formed by a cross wall 25 and an open side 26 opposite the cross wall 25. Two side walls 27 extend from the cross wall to the open side 26 of the U-channel. The U-channels are attached to each other in a parallel, closed-side to open-side sequence, forming a corresponding series of cooling channels 23 oriented span-wise S (i.e. a radial or longitudinal direction). Known bonding techniques may be used to attach the U-channels to each other, such as laser or electron beam welding, metal diffusion bonding, and/or transient liquid phase bonding. A first of the U-channels 22A forms a leading edge 24 of the airfoil. The first U-channel may have a cross wall 25 that merges smoothly with the side walls 27 in a shape corresponding to the leading edge 24 of the airfoil. A last of the U-channels 22E has side walls 27 that converge and bond to each other distally to form the trailing edge 28 of the airfoil 20. The legs 27 of the U-channels form the outer skin of the airfoil, while the cross walls 25 form internal bracing of the airfoil 20, except that the cross wall 25 of the first U-channel forms the leading edge portion of the skin of the airfoil. The particular number of U-channels shown in the drawings is exemplary and not limiting.

Figure 2:
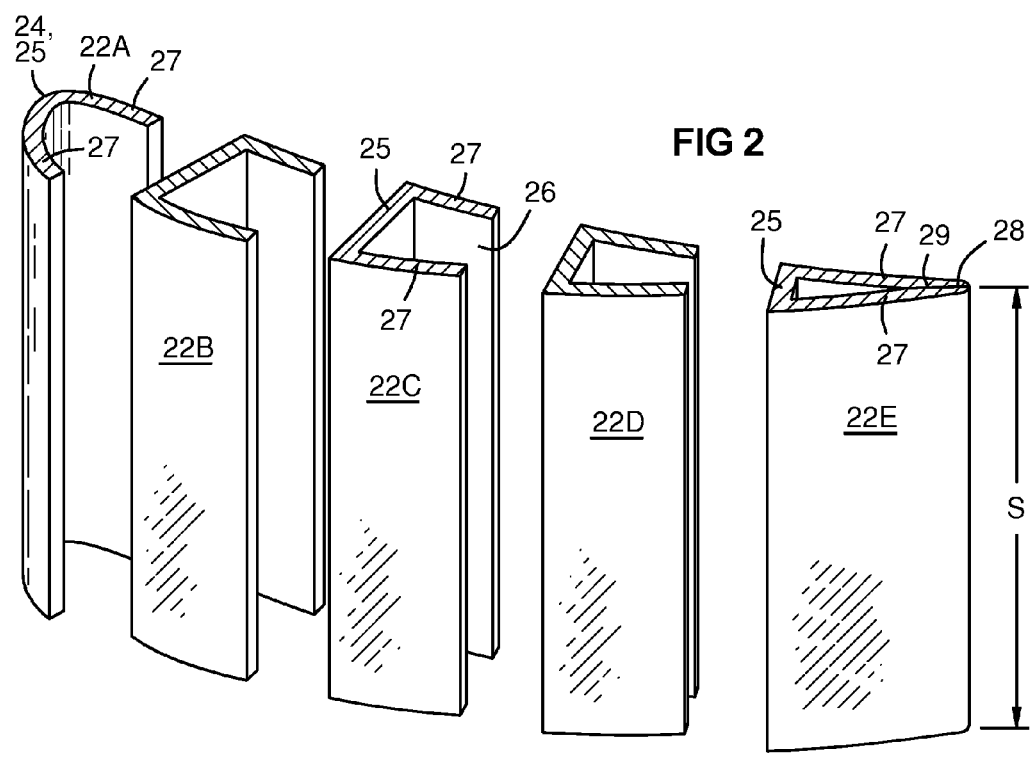
FIG. 2 is an exploded view of the airfoil of FIG. 1.

FIG. 2 shows an exploded view of FIG. 1 prior to the bonding of the U-channels together. The U-channels 22A-22E may be individually fabricated from sheet materials. Examples of suitable sheet materials include Haynes 230 or Haynes 282, which are nickel-based superalloys known for use in high-temperature environments. Sections may be cut from a sheet of the material, and the U-channels may be formed from the sections using known forming techniques such as bending, stamping, and hydro-forming. The bonding surfaces of adjacent U-channels to be joined may then be machined for close conformance there between to facilitate the bonding process. The trailing edge legs 27 of the last U-channel 22E may be tapered by machining ramps 29 on the inner surfaces of the legs 27 as shown to produce a trailing edge 28 that is thinner than the combined thickness of the legs 27. Although FIGS. 1-3 shows the sheet material bent with sharp corners between the skin and the cross walls, curved edges may be used. The sheet material may be selected to exhibit a preferred metal grain orientation, such as a metal grain orientation in a span-wise direction S, thereby favorably orienting a stronger axis of the material in a direction of higher stress in the operating environment of the airfoil 20.

Figure 4:
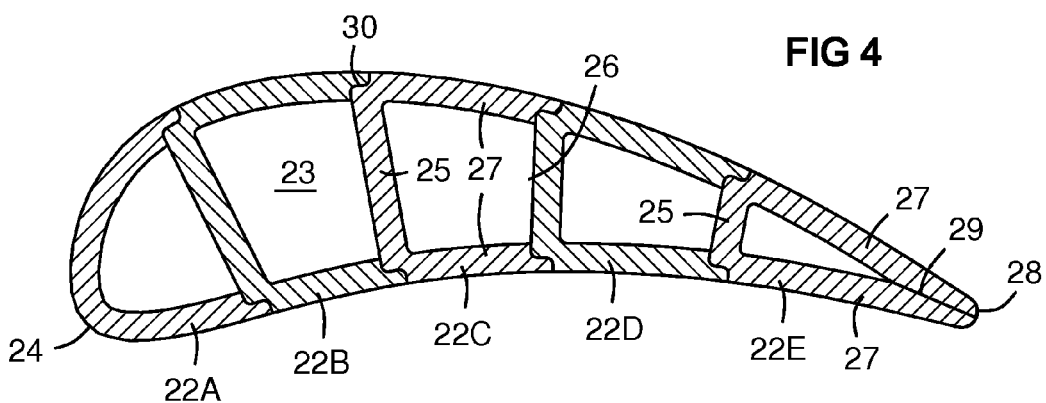
FIG. 4 is sectional view of another embodiment of the invention.

FIG. 4 shows an embodiment with machined half lap joints 30 at the joint locations. Such features enhance assembly as each section will more naturally locate against the adjacent section.

Figure 5:
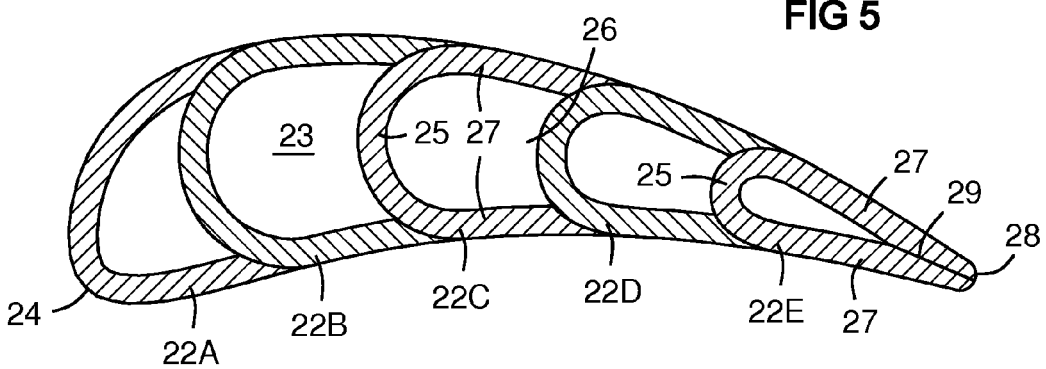
FIG. 5 is sectional view of another embodiment of the invention.

FIG. 5 shows an embodiment in which each cross wall 25 is continuously curved, and merges with its side walls 27 at a tangent to a curve of the cross wall. This reduces bending stress in sheet metal fabrication. Half lap joints 29 may also be used in this embodiment.

FIG. 6 is a flowchart of a method 40 of the invention with the following steps:
    41—Form a sheet of material;
    42—Cut the sheet into sections;
    43—Form each section into a U-channel;
    44—Form a first of the U-channels with a curved cross wall to form a leading edge of an airfoil;
    45—Converge and bond the side walls of a last U-channel to form a trailing edge;
    46—Attach the U-channels together in parallel, forming an airfoil with span-wise cooling channels.

Step 45 may be performed either before or after step 46. After the airfoil is formed as above, it may be mounted between two vane platforms to form a turbine vane. Alternately it may receive a fitted end cap on one end and a platform on the other end to form a turbine blade for mounting in a turbine rotor disk.

FIG. 7 shows an embodiment with a series of U-channels 22A-22D and a solid trailing edge section 22E'. The outer surfaces 32 of the trailing edge section 22E' may be cooled by a film of coolant from film cooling holes (not shown) in the side walls 27 of any or all of the U-channels, or cooling channels (not shown) may be formed through the trailing edge section 22E'. Half-lap joints 30 as in FIG. 4 and/or curved cross walls 25 as in FIG. 5 may also be used with this embodiment.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A turbine airfoil comprising:
    a leading edge and a trailing edge extending in a span-wise direction;
    a plurality of U-channels, each U-channel comprising a closed side formed by a cross wall, an open side opposite the cross wall, and two side walls extending from the cross wall to the open side;
    the U-channels attached to each other in a parallel, closed-side to open-side sequence, forming a series of cooling channels oriented span-wise;
    a first of the U-channels comprising a curved cross wall forming the leading edge;
    wherein a last of the U-channels comprises side walls that converge and bond to each other distally, forming the trailing edge comprising ramps on distal inner portions of the side walls of the last of the U-channels, said ramps configured to form the trailing edge thinner than a combined thickness of the side walls of the last of the U-channels.

2. The turbine airfoil of claim 1, wherein each side wall bonds to an adjacent one of the U-channels with a half lap joint, except for the side walls forming the trailing edge.

3. The turbine airfoil of claim 1, wherein each cross wall is continuously curved, and merges with its respective side walls at a tangent to a curve of the cross wall.

4. The turbine airfoil of claim 1, wherein each U-channel is formed of a superalloy sheet material having a metal grain orientation in a span-wise direction.

5. The turbine airfoil of claim 1, wherein the side walls form an outer skin of the airfoil, and the cross walls form internal bracing between the cooling channels, except the cross wall of the first U-channel forms the leading edge of the airfoil.

6. A method of fabricating a turbine airfoil, comprising:
    forming each of a plurality of sheets of material into a respective U-channel comprising a closed side and an open side, wherein a cross wall forms the closed side, and wherein two side walls extend from the cross wall to the open side;
    attaching the U-channels to each other in a parallel, closed-side to open-side sequence, forming an airfoil having a corresponding series of cooling channels oriented span-wise with respect to a span of the airfoil, a first of the U-channels forming a leading edge of the airfoil;
    converging and bonding the side walls of a last of the U-channels, forming a trailing edge of the airfoil; and
    forming ramps on distal inner portions of the side walls of a last U-channel, said ramps making the trailing edge thinner than a combined thickness of the side walls of the last U-channel.

7. The method of claim 6, further comprising forming half lap joints between each side wall and an adjacent U-channel in the sequence, except for the side walls of the last of the U-channels.

8. The method of claim 6, wherein each cross wall is continuously curved, and merges with its extending side walls at a tangent to a curve of the cross wall.

9. The method of claim 6, wherein the U-channels are formed by bending, stamping, or hydro-forming the sections, and the U-channels are attached to each other by laser welding, electron beam welding, metal diffusion bonding, or transient liquid phase bonding.

10. The method of claim 6, further comprising orienting each of the sheets of material to have a metal grain orientation in the span-wise direction.

11. A method of fabricating a turbine airfoil, comprising:
    forming a sheet of metal;
    cutting the sheet into sections;
    forming each section into a channel comprising a cross wall and two side walls;
    forming a first of the channels with a curved cross wall defining a leading edge;
    attaching the channels to each other in parallel closed-side to open-side sequence to form an airfoil, wherein the cross wall of the first channel and the side walls of all of the channels form a skin of the airfoil
    converging and bonding together the side walls of a last of the channels to define a trailing edge; and
    forming ramps on distal inner portions of the side walls of the last channel to form the trailing edge thinner than a combined thickness of the side walls of the last channel.

12. The method of claim 11, further comprising forming half lap joints at bonding areas of adjacent channels.

* * * * *